United States Patent
Peltier et al.

[11] Patent Number: 5,950,799
[45] Date of Patent: Sep. 14, 1999

[54] GENERATION OF LEHR LOADER MOTION PROFILE IN AN INDIVIDUAL SECTION GLASSWARE FORMING SYSTEM

[75] Inventors: James M. Peltier, Ypsilanti, Mich.; D. Wayne Leidy, Perrysburg, Ohio

[73] Assignee: Owens-Brockway Glass Container Inc., Toledo, Ohio

[21] Appl. No.: 08/773,456

[22] Filed: Dec. 24, 1996

[51] Int. Cl.⁶ .................................................. B65G 25/00
[52] U.S. Cl. .......................................... 198/430; 198/432
[58] Field of Search .................................. 198/429, 430, 198/597, 426

[56] References Cited

U.S. PATENT DOCUMENTS

| | | |
|---|---|---|
| 3,687,262 | 8/1972 | Campbell et al. . |
| 3,765,856 | 10/1973 | Bowman . |
| 4,003,464 | 1/1977 | Zappia ..................................... 198/430 |
| 4,067,434 | 1/1978 | Mumford ............................... 198/427 |
| 4,193,784 | 3/1980 | Mumford ............................... 198/427 |
| 4,290,517 | 9/1981 | Hafferkamp ............................... 65/69 |
| 4,793,465 | 12/1988 | DiFrank ................................. 198/432 |
| 5,044,488 | 9/1991 | Bolin ..................................... 198/430 |
| 5,092,449 | 3/1992 | Bolin et al. .............................. 198/430 |
| 5,472,077 | 12/1995 | Bolin ..................................... 198/430 |

OTHER PUBLICATIONS

"Development of the Variable-Rate Transymmetric Motion With Discretely Vanishing Shock", The American Society of Mechanical Engineers, Jun. 10, 1983.

*Primary Examiner*—James R. Bidwell

[57] ABSTRACT

In an individual section (IS) glassware forming system that includes a lehr loader having a loader bar and electric actuators for controlling motion at the loader bar along forward, sideshift and lift axes independently of each other to load glassware from a cross conveyor across a transfer plate onto a lehr conveyor, apparatus for controlling motion at the loader bar includes an operator station for entry of a plurality of control parameters that relate to physical characteristics of the glassware, cross conveyor, transfer plate, lehr and loader bar. The operator station includes prestored programming for automatically translating the control parameters entered by the operator into motion profiles for each of the three axes, with each of the profiles comprising a data set of motion data versus time data. An electronic controller is coupled to the electric actuators for controlling motions at the loader bar along the three axes as a function of associated sets of motion data versus time data.

16 Claims, 7 Drawing Sheets

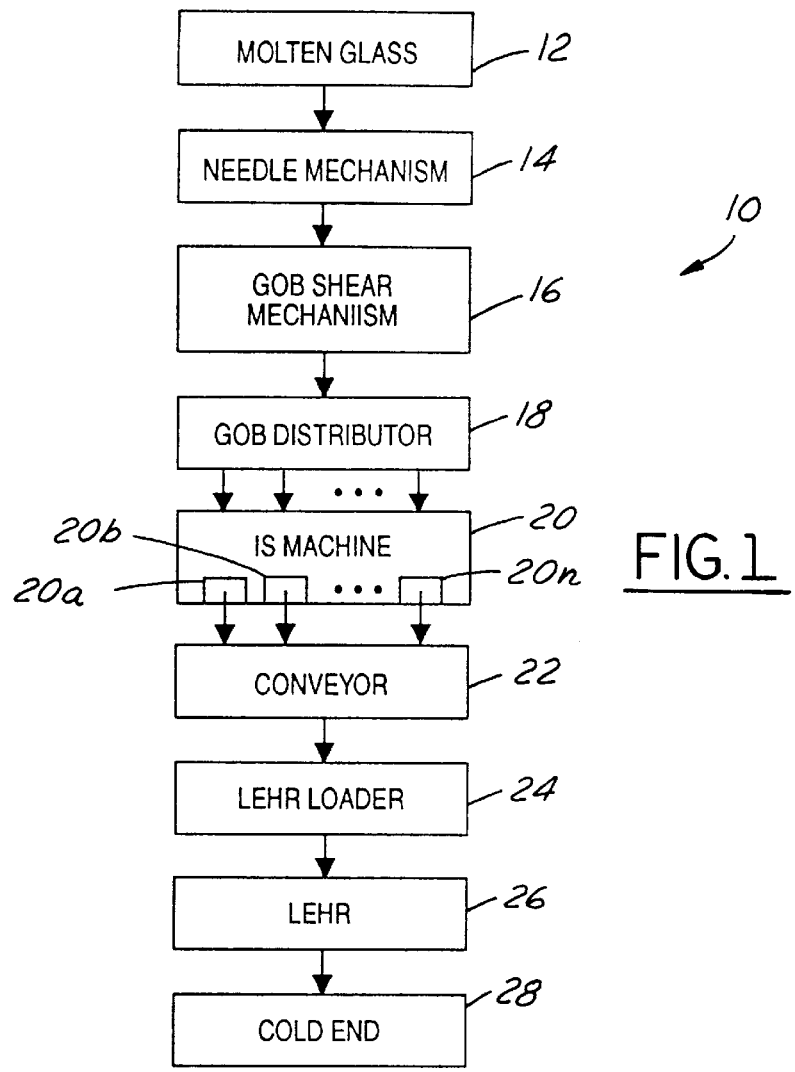
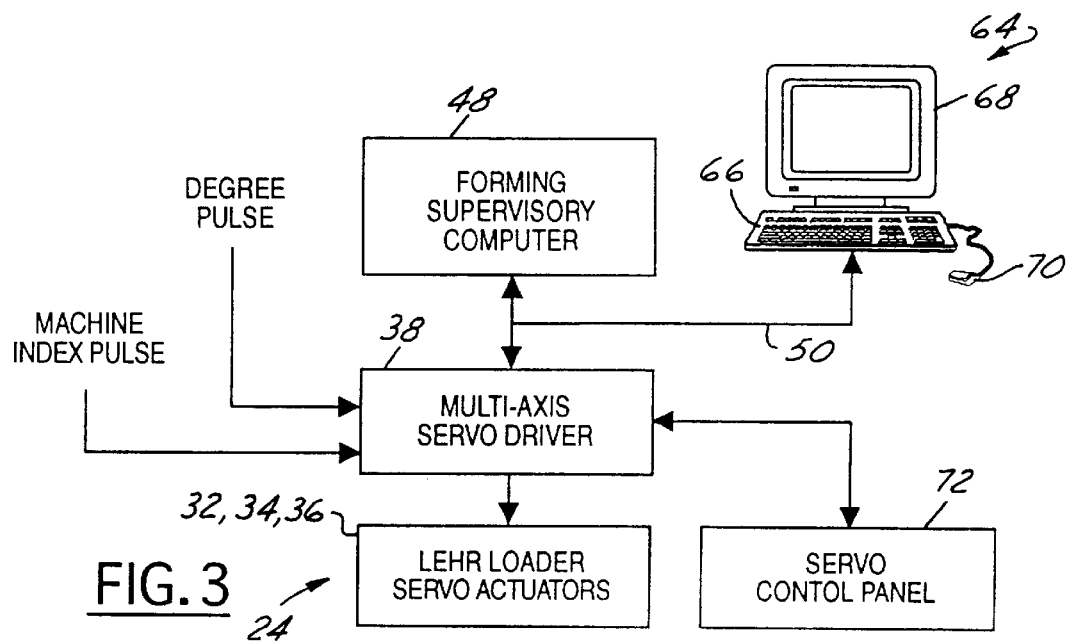

*68a*

PROFILE PARAMETERS

Forward Motion
1) Pullback Distance: 9.63 in.
2) Bottle Diameter: 2.880 in.
3) Bottle Leading Edge To Conveyor Leading Edge: 1.38 in.
4) Push On: -0.38 in.
5) Total Forward Stroke: 19.51
6) Contact Velocity @ Max Cycle Rate: 6.00 in/s
7) Distance at Contact Velocity: 0.25 in.
8) Forward Deceleration Distance: 6.10 in.

Cycle Time
9) Maximum Loader CPM: 20.00
10) Desired Loader CPM: 14.00
11) Percent for Return Motion: 48.00 %
12) Percentage of time allocated to contact: 16.00 %

Side Shift Motion
13) Total Side Stroke: 18.50 in.
    ☐ Staggered Profile
14) Staggered Side Stroke: ___ in.
15) Distance To Reach Velocity: 3.00 in.
16) % Matching Velocity: 100.00 %
17) Forward Distance from contact to begin slowdown: 1.75 in.
18) Lehr Width: 33 bot.
19) Center To Center Distance on Conveyor: 113.920 in.

Lift Motion
21) Lift Safety Buffer: 4.25 in.
22) Lift Height: 7.25 in.
23) Lift Buffer Raise Offset: 0.00 in.

Other Parameters
Loader Bar Part Number:
DANVILLE#1
AUBURNGB36
AUBURNGB27
10FT

[ Reference Image ]    [ Print ]  [ Ok ]  [ Cancel ]

FIG.5

GENERATION OF LEHR LOADER MOTION PROFILE IN AN INDIVIDUAL SECTION GLASSWARE FORMING SYSTEM

This application includes a microfiche appendix consisting of one sheet of fiche containing seventeen frames.

The present invention is directed to individual section (IS) machine glassware forming systems, and more particularly to a method and apparatus for generating and modifying the motion profile of the lehr loader in such a system.

BACKGROUND AND OBJECTS OF THE INVENTION

The art of glass container manufacture is currently dominated by the so-called individual section or IS machine. Such machines include a plurality of separate or individual manufacturing sections, each of which has a multiplicity of operating mechanisms for converting one or more charges or gobs of molten glass into hollow glass containers and transferring the containers through successive stages of the machine section. In general, an IS machine system includes a glass source with a needle mechanism for controlling a stream of molten glass, a sheer mechanism for cutting the molten glass stream into individual gobs, and a gob distributor for distributing the individual gobs among the individual machine sections. Each machine section includes one or more parison molds in which a glass gob is initially formed in a blowing or pressing operation, one or more invert arms for transferring the parison blanks to blow molds in which the containers are blown to final form, tongs for removing the formed containers onto a deadplate, and a sweepout mechanism for transferring molded containers from the deadplate to a cross conveyor. The conveyor receives containers from all sections of an IS machine, and conveys the containers to a loader for transfer to an annealing lehr. Operating mechanisms in each section also provide for closure of mold halves, movement of baffles and blowing nozzles, control of cooling wind, etc. U.S. Pat. No. 4,362,544 includes a background discussion of the art of both "blow and blow" and "press and blow" glassware forming processes, and also discusses an electropneumatic individual section machine adapted for use in either process.

The various operating mechanisms of the IS machine system were initially operated and synchronized with each other by means of a machine shaft, a multiplicity of individual cams rotatably carried by the shaft, and pneumatic valves responsive to the cams for selectively feeding air under pressure to the various operating mechanisms. The current trend in the art is toward replacement of the shaft, mechanical cams and pneumatic actuators with electric actuators responsive to drivers operated by so-called "electronic cams." These electronic cams take the form of motion profile information for the various operating mechanisms stored in electronic memory and selectively retrieved by electronic control circuitry for operating the electric actuators. Thus, such motions as forming and severing of the glass gobs, moving of the parisons and containers, opening and closing of the blow molds, in and out motions of the funnels, baffles and blow heads, and motions of the sweep-out and lehr-loading devices are accomplished electronically from motion profile information digitally stored in electronic memory, with motions at the various machine sections being synchronized with each other by common clock and reset signals. See U.S. Pat. No. 4,762,544.

In IS machine glassware forming systems that employ mechanical actuating cams on a machine shaft, adjustment of timing and motion profiles of the various operating mechanisms required adjustment or replacement of individual cams. In systems that employ electronic cams, it is often still necessary to stop the machine or machine section, change the motion profile electronically, and then restart the machine. For example, control techniques of the type disclosed in U.S. Pat. No. 4,548,637 typically require generation and storage of new profile data in an electronic read-only memory, often at a location remote from the glassware manufacturing plant, and shut-down of the manufacturing system to permit installation of the memory in the control electronics.

A system was employed by applicants' assignee beginning in about the mid 1980's for electronically designing the actuating cams of a cam-operated lehr loader mechanism of the type shown in U.S. Pat. No. 4,290,517. In this computer-based system, the operator was prompted to enter a number of profile and machine parameters, following entry of which motion profiles for the loader bar forward and sideshift axes were automatically generated from equations prestored in computer memory. The system was capable of displaying calculated profiles (position, velocity and/or acceleration) for operator observation and verification, and/or printing such profiles on a stripchart-type recorder. The system also provided for a graphic display on an operator screen simulating motion of the lehr loader bar relative to containers on the cross conveyor, from which the operator could verify motions of the loader bar and identify possible interference between the loader bar and glassware on the cross conveyor. When the desired forward and sideshift motions had been observed and verified, the system prepared a numeric controlled tape from which mechanical cams could be generated employing conventional CNC processes for obtaining the desired forward and sideshift motions at the lehr loader.

Although the system so described addressed and overcame many problems associated with manual design of mechanical cams and may be readily implemented in corresponding design of electronic cams, further improvements remain desirable. For example, the prior art system accommodated some variations along the forward and sideshift axes, but did not accommodate electronic design along the lift axis of the loader bar. Furthermore, mechanical linkage between the forward and sideshift axes in the lehr loader mechanism was such as to reduce flexibility of profile design due to the lack of independence of motion along these two axes. That is, the forward and sideshift axes were required to have a specified relationship, which could not accommodate independent motion between these axes. The velocity of the loader bar relative to the glassware at the moment of contact between the loader bar and the glassware was not controllable. There was an automatic 50/50 split between advance and return strokes of the loader bar, further reducing flexibility of motion design. Furthermore, the return motions were always the reverse of the advance motions, further reducing design flexibility.

It is a general object of the present invention to provide a system and method for selectively designing and/or modifying the motion profiles of the loader bar in the lehr loader mechanism of a glassware forming system having greater design flexibility than systems heretofore proposed, as discussed above. Another and related object of the invention is to provide a system and method of the described character in which the motion profiles may be controlled independently of each other. A further object of the present invention is to provide a system and method for lehr loader profile control that may be readily implemented in a manufacturing environment with a minimum of operator training. A more specific object of the present invention is to provide a method and system for generating motion control profiles for a lehr loader mechanism in which profile data can be readily changed, in which profile modifications are made off-line while the system is operating, which are user friendly, and which can be readily employed for creating and storing a library of lehr loader motion control profiles that may be later selected for use by an operator. Another and yet more specific object of the present invention is to provide a method and system for generating motion control profiles for the lehr loader mechanism of an IS machine system by means of which plant personnel are allowed to select and/or modify the motion profiles to obtain optimum performance at the lehr loader for a given set of container handling conditions, that allow such profile selection and/or modification on an immediate basis, in which a plurality of standard profiles may be selectively generated and stored, and that operate by means of a Windows-based operating system.

SUMMARY OF THE INVENTION

In an individual section (IS) glassware forming system that includes a lehr loader having a loader bar and electric actuators for controlling motion at the loader bar along forward, sideshift and lift axes independently of each other to load glassware from a cross conveyor across a transfer plate onto a lehr conveyor, apparatus for controlling motion at the loader bar includes an operator station for entry of a plurality of control parameters that relate to physical characteristics of the glassware, cross conveyor, transfer plate, lehr and loader bar. The operator station includes prestored programming for automatically translating the control parameters entered by the operator into motion profiles for each of the three axes, with each of the profiles comprising a data set of motion data versus time data. An electronic controller is coupled to the electric actuators for controlling motions at the loader bar along the three axes as a function of associated sets of motion data versus time data.

Operator entry of control parameters in the preferred embodiment of the invention is implemented by means of a table of control parameters and associated parameter numeric values on an operator display screen and facilities such as a cursor control and keyboard for selectively varying the numeric values under control of the operator. The profile data sets may be selectively displayed graphically as a function of time. In the preferred embodiment of the invention, equations are prestored in the memory of the operator counsel for automatically translating the control parameters into acceleration, velocity and position profile data sets, any one or more of which may be employed for controlling motions at the lehr loader in acceleration, velocity and position control modes of operation, or combinations thereof. Any of the acceleration, velocity and position profiles along any of the three axes of motion may be selectively displayed for operator observation and verification. However, the profile graphs may not be altered directly, but only through changes in control parameters. The operator console also includes facility for generating a static graphic display that illustrates separation between the loader bar and glassware on the cross conveyor for operator observation of any interference that may take place. In the preferred embodiment of the invention, the graphic and/or tabular display and the operator control facility are implemented in a Windows-based graphic user interface, which can be readily learned and manipulated by an operator.

BRIEF DESCRIPTION OF THE DRAWINGS

The invention, together with additional objects, features and advantage thereof, will be best understood from the following description, the appended claims and the accompanying drawings in which:

FIG. 1 is a functional block diagram of an individual section (IS) glassware forming system in which the present invention preferably is implemented;

FIG. 3 is a functional block diagram of an electronic control arrangement for operating the lehr loader station of FIG. 2;

FIGS. 5 and 6 are Windows-type tabular displays for setting profile and machine parameters in accordance with the presently preferred embodiment of the invention;

DETAILED DESCRIPTION OF PREFERRED EMBODIMENTS

Figure 2:
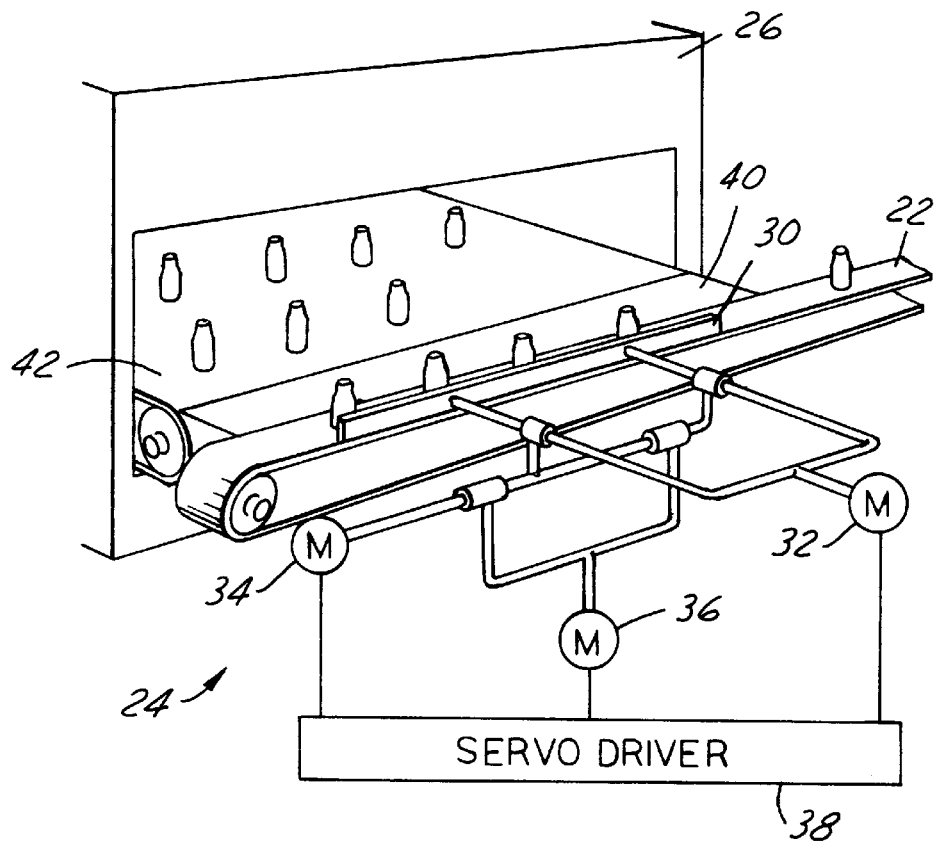
FIG. 2 is a schematic diagram of a lehr loader station in the system of FIG. 1 for loading glassware from a cross conveyor across a transfer plate onto a lehr conveyor.

FIG. 1 illustrates an IS machine glassware forming system 10 as comprising a reservoir or bowl 12 containing molten glass (from a forehearth) that is fed by a needle mechanism 14 to a shear mechanism 16. Shear mechanism 16 severs individual gobs of molten glass, which are fed by a gob distributor 18 to an IS machine 20. IS machine 20 includes a plurality of individual sections 20a, 20b . . . 20n, within which the gobs are formed into individual pieces of glassware. Each section terminates in a sweepout station, from which the articles of glassware are delivered to a common cross conveyor 22. Conveyor 22, usually an endless belt conveyor, delivers the containers in sequence to a lehr loader 24, which loads the containers in batches into an annealing lehr 26. The containers are delivered by lehr 26 to the so-called cold end 28 of the manufacturing cycle, at which the containers are inspected for commercial variations, sorted, labeled, packaged and/or stored for further processing.

System 10 illustrated in FIG. 1 includes a multiplicity of operating mechanisms for performing operations on the glass, moving glass workpieces through sequential steps of operation, and otherwise performing functions in the system. Such operating mechanisms include, for example, needle mechanism 14, gob shear mechanism 16, gob distributor 18 and lehr loader 24. In addition, there are a multiplicity of operating mechanisms within each section of IS machine 20, such as mechanisms for opening and closing the molds, mechanisms for in and out motions of the funnels, baffles and blow heads, and mechanisms for motions of the invert arms and take-out tongs, and mechanisms for operating the sweepout heads.

To the extent thus far described, IS machine glassware forming system 10 is of conventional construction. Reservoir 12 and needle mechanism 14 may be as shown, for example, in U.S. Pat. No. 3,419,373. In a currently preferred embodiment of the invention, needle mechanism 14 is as disclosed in U.S. application Ser. No. 08/597,760. Gob shear mechanism 16 may be as in U.S. Pat. No. 3,758,286 or 4,499,806, or more preferably as shown in U.S. application Ser. No. 08/322,121 filed Oct. 13, 1994. Gob distributor 18 may be as in U.S. Pat. No. 4,529,431 or 5,405,424. U.S. Pat. Nos. 4,362,544 and 4,427,431 illustrate typical IS machines 20, and U. S. Pat. Nos. 4,199,344, 4,222,480 and 5,160,015 illustrate typical sweepout stations. U.S. Pat. Nos. 4,193,784, 4,290,517, 4,793,465 and 4,923,363 illustrate conventional lehr loaders 24. U.S. Pat. Nos. 4,141,711, 4,145,204, 4,338,116, 4,364,764, 4,459,146 and 4,762,544 illustrate various arrangements for electronic control of glassware manufacture in an IS machine system. A system for controlling motions of IS machine operating mechanisms is illustrated, for example, in above-noted U.S. Pat. No. 4,548,637. The disclosures of all U.S. patents and applications noted above are incorporated herein by reference for purposes of background.

FIG. 2 schematically illustrates lehr loader 24 as comprising a loader bar 30 coupled to a first electric actuator 32 for controlling advance and return motion of the loader bar along a forward axis transverse to the direction of motion of containers on cross conveyor 22. Loader bar 30 is also coupled to a second electric actuator 34 for controlling motion of the loader bar along a sideshift axis parallel to the direction of motion of containers on cross conveyor 22, and to a third electric actuator 36 for controlling motion of the loader bar along a vertical lift axis perpendicular to conveyor 22. Thus, motions of loader bar 30 along the forward, sideshift and lift axes are controlled independently of each other by means of respective electric actuators 32, 34 and 36. Electric actuators 32, 34, 36, which may comprise electric servo motors for example, are all connected to a multi-axis servo driver 38. In general, as containers are presented by cross conveyor 22, loader bar 30 is accelerated from the start position illustrated in FIG. 2 along the forward and sideshift axes by operation of actuators 32, 34 so as to engage the containers on cross conveyor 22 and propel the containers across a transfer plate 40 onto a lehr mat or conveyor 42. Lehr mat 42 conveys the containers into annealing lehr 26. In the meantime, transfer bar 30 is lifted upwardly by actuator 36 and then retracted by actuators 32, 34 so as to pass above and behind further containers being transported on conveyor 22. At the end of such return motion, the loader bar is returned to the starting position illustrated in FIG. 2 preparatory to the next cycle of operation. To the extent thus far described, a presently preferred embodiment of lehr loader 24 is illustrated in U.S. application Ser. No. 08/854,042 filed May 8, 1997 (Docket 17041) assigned to the assignee hereof, the disclosure of which is also incorporated herein by reference for purposes of background.

FIG. 3 illustrates a portion of the IS machine operating system (see above-referenced U.S. Pat. No. 4,548,637) devoted specifically to operation of lehr loader 24. A forming supervisory computer 48 is connected by an ethernet system 50 to multi-axis servo driver 38. Driver 38 also receives machine index pulses and degree pulses for synchronizing operation of all controlled mechanisms to operation of the overall forming system. Servo driver 38 contains microprocessor-based control circuitry and memory for receiving and storing profile and other control information from ethernet 50 (or by manual transfer on floppy disk), and controlling operation at multiple mechanisms, including servo actuators 32, 34, 36. An operator console 64 includes a computer 66, with internal memory, an operator screen 68 and control device such as a mouse 70, connected to computer 48 and driver 38 by ethernet 50. Operator console 64 may comprise, for example, an IBM-compatible personal computer. Among other functions, operator console 64 provides facility for selectively changing lehr loader profiles at driver 38, as will be described. Driver 38 is also connected to an operator servo control panel 72, by means of which the operator can select the control profiles to be used for each axis of the lehr loader, and the starting point or offset for each profile.

The motion control profiles for the lehr loader (as well as the other operating mechanisms) are preferably provided as a library of profiles prestored in memory within console 64. The library of prestored profiles may be selectively modified by the operator through operator console 64. Console 64 is preprogrammed (as will be described in detail) to generate motion profiles for the lehr loader, and to allow the operator to design and modify such profiles so that loader bar motion can be optimized for improved delivery of glassware to lehr 26 (FIGS. 1 and 2). Once a desired set of motion profiles (position, velocity and/or acceleration) are selected and downloaded into driver 38, driver 38 thereafter controls motions at lehr loader 24 independently of computer 48 or console 64 (in the absence of intervention, of course). The profile data downloaded and stored in driver 38 may comprise blocks or tables of 1024 position versus time data elements in fractional time increments for each axis of motion, for example, for a position control mode of operation. Thus, acceleration, velocity and position profile data are automatically calculated, and any one or more of these data blocks may be employed for control purposes in various modes of operation. The blocks of motion data (position, velocity and/or acceleration data) versus time data elements may be in fractional units of real time, as will be described. Alternatively, the time base of the motion profiles may be in fractional increments of machine degrees for synchronizing operation of the lehr loader to operation of the other IS machine operating mechanisms.

Figure 4A:
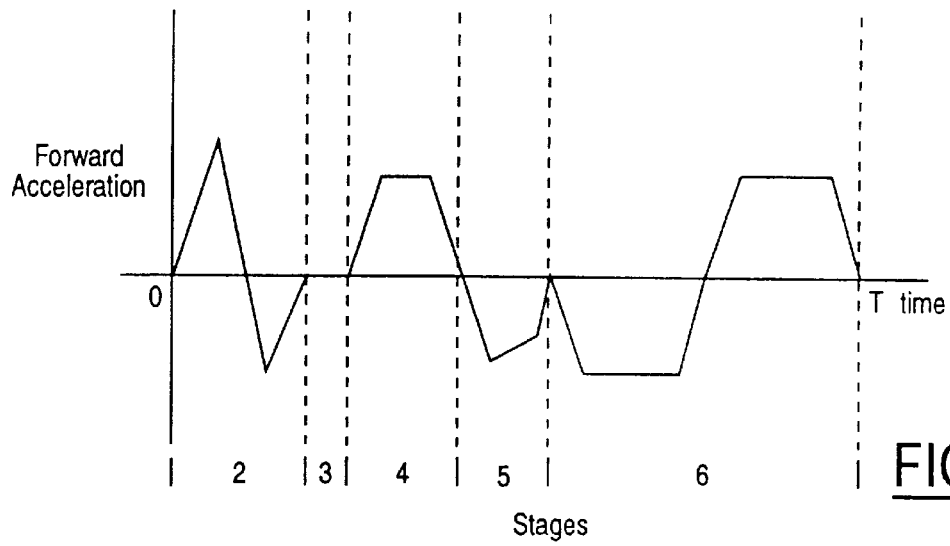
FIGS. 4A–4C are graphic illustrations of lehr loader bar acceleration profiles in accordance with a presently preferred embodiment of the invention.
Figure 4B:
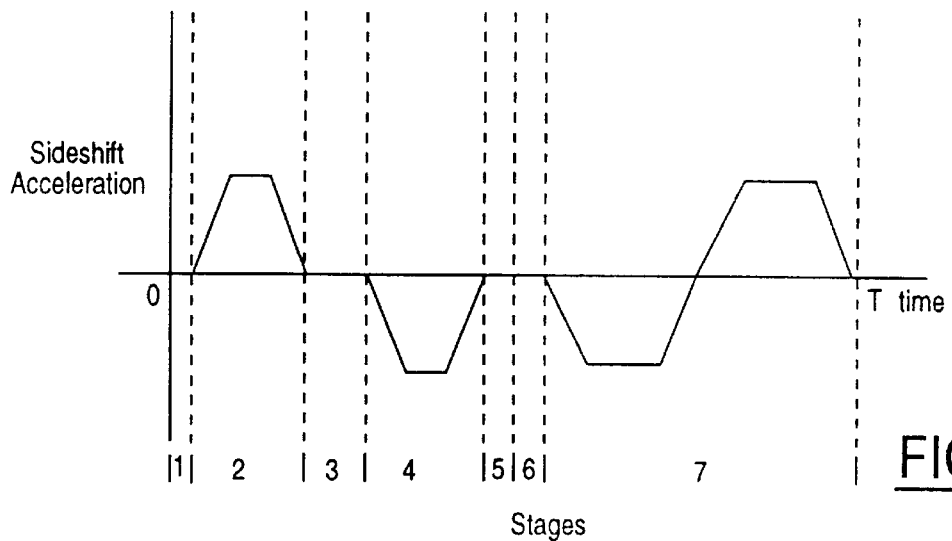
Figure 4C:
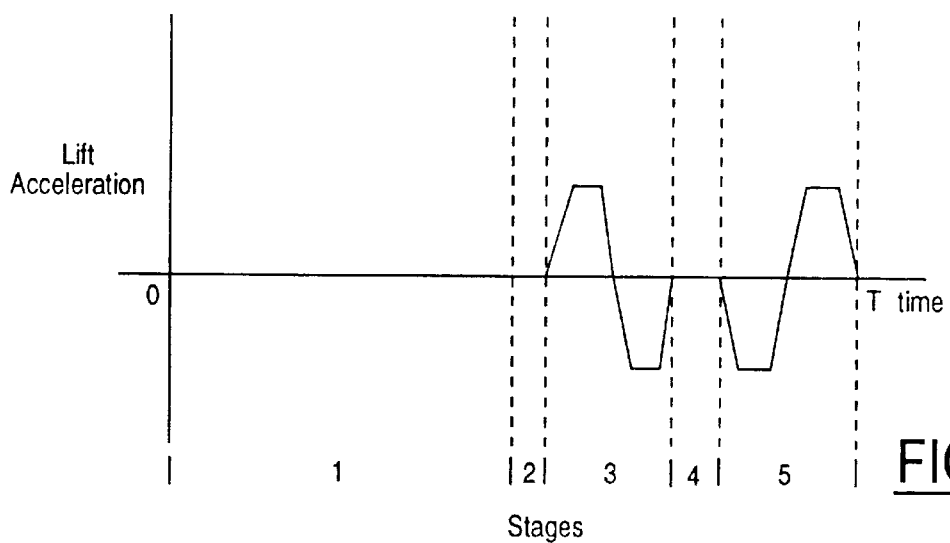

The programming within driver 38 for translating machine and profile control parameters into motion profile data is stored separately for each of the three axes (forward, sideshift and lift), and the motion data is computed separately for each advance stroke and each return stoke. This programming is based upon a set of equations for controlling motion along each axis by balancing torque requirements and container handling. The equation set implemented in the currently preferred embodiment of the invention is set forth in the microfiche appendix that accompanies and forms part of this application. This microfiche appendix includes three sub-appendices: Appendix A (frames 3–6), Appendix B (frames 7–12) and Appendix C (frames 13–17). The equations are designed to work with acceleration as the primary graph as illustrated in FIGS. 4A–4C, with each acceleration profile being a piecewise linear profile. The velocity equations are defined by mathematically integrating the acceleration equations, and the position equations are defined by mathematically integrating the velocity equations. As also shown in FIGS. 4A–4C, each of the forward, sideshift and lift acceleration profiles is divided into a number of stages representing conditions at the several axes during given time periods. A number of these stages coincide with each other, as will be described.

The forward acceleration profile (FIG. 4A) controls the axis that moves loader bar 30 (FIG. 2) into and out of the lehr. This forward motion is divided into six distinct stages. The first stage is currently not used. The second stage defines a time period from the start of the cycle to the point in time at which the loader bar contacts the containers. At this point, the loader bar is at the forward container contact velocity, and the bar has traveled a distance along the forward axis equal to the so-called pullback distance, which is the separation between containers on conveyor 22 (FIG. 2) and the loader bar at the start position of the loader bar. This stage employs the 3×3×3 equation set defined in Appendix B, which allows the operator to specify initial and final conditions for time, acceleration, velocity and position. The third stage in FIG. 4A defines a time of constant forward velocity from contact of the loader bar with the bottles. During this time, the loader bar continues to move at container contact velocity. The final position of this stage is determined by the velocity and the total time duration. The fourth stage defines a time from the end of the constant velocity period through acceleration of the containers across transfer plate 40 (FIG. 2). This stage is used to accelerate the containers across the conveyor. The equations of Appendix A are employed, with input of initial and final values for time, acceleration and position. The final velocity is determined by the equations. The fifth stage defines a forward motion slow-down period until the loader bar completes the advance stroke and has zero forward velocity. At this point, the containers have been advanced from conveyor 22 (FIG. 2) across transfer plate 40 onto lehr mat 42. This stage employs the 3×3×3 equations of Appendix B. These equations allow input of initial and final conditions for time, acceleration, velocity and position. During the sixth stage in FIG. 4A, the loader bar executes a return stroke, first of increasing negative acceleration then decreasing to a positive acceleration up to time T at the end of a complete cycle, at which time loader bar 30 has been returned to its initial position illustrated in FIG. 2. This stage uses the transymmetric equations of Appendix C, which allow setting of initial and final time and position values. Jerk limit is set based upon performance of the machine.

The sideshift acceleration profile controls the axis of movement parallel to cross conveyor 22, and is divided into seven distinct stages as illustrated at FIG. 4B. The first stage is a dwell time that is used to delay beginning of the sideshift motion. The time duration is based upon the time required for stage two. The second stage defines a time period from the end of dwell to the point in time when the loader bar is traveling at a set percentage of the conveyor velocity. This stage uses the equations of Appendix A, which allow initial and final values for velocity and position to be set. Time duration is calculated based upon these parameters, as well as a jerk limit of acceleration. It will be noted in FIGS. 4A and 4B that the end of forward motion stage two in FIG. 4A coincides with the end of sideshift motion stage three in FIG. 4B, which is to say that the sideshift velocity must reach the desired percentage of conveyor speed at container contact time. The third stage of the sideshift acceleration profile in FIG. 4B defines a time from when the percent matching velocity is reached to the time when the forward motion of the loader bar clears the row of containers on conveyor 22. This is a critical time in that the edge of the loader bar must clear the first container not engaged by the loader bar without interfering with travel of that container. Time duration is calculated so that forward motion has pushed the containers far enough safely to begin deceleration. The fourth stage of the sideshift acceleration profile in FIG. 4B defines a the time of sideshift deceleration to the time when sideshift motion is completed. This stage uses the equations of Appendix A. Time duration is based upon input velocity, position and jerk limit values. This fourth stage is followed by a fifth stage, which is a dwell stage until the load cycle is complete, followed by a dwell in a sixth stage until the sideshift return motion can begin. Time delays in stages five and six are based upon the time needed in stage four to decelerate the loader bar and the time needed for return motion, respectively. The seventh and final stage is defined as the time when the sideshift return motion begins, and continues to the end of the full cycle at time T. This stage begins when the forward motion has retracted enough so that the loader bar is clear of the containers, and ends at end-of-cycle time T. This stage uses the transymmetric equations of Appendix C. Jerk limit is set based upon performance of the machine.

The lift acceleration profile (FIG. 4C) controls the axis that moves loader bar 30 up and down. The lift motion is divided into five distinct stages, of which the first stage is defined from the start of the cycle to the end of the loading cycle—i.e., at the end of stage five for the side shift motion in FIG. 4B. There is no lift motion during this time. The second stage in FIG. 4C defines a time period from the end of the loading cycle (FIGS. 4B and 4C) to the point in time when the loader bar can begin to rise to the proper height. This time delay is constant and based upon machine performance. The loader bar is raised to proper height to clear the containers during the third stage. This stage uses the transymmetric equations of Appendix C, with the jerk limit again being based upon performance. The loader bar is maintained at this height during the fourth stage in FIG. 4C. During the fifth stage, the loader bar is returned to the height for contacting containers at the end of the cycle at time T. This stage uses the transymmetric equations of Appendix C, with input of initial and final time and position values. Jerk limit is again based upon system performance. It will be noted that all of the return strokes in FIGS. 4A–4C begin simultaneously—i.e., at the time that corresponds to the end of the fifth stage in FIG. 4A.

In summary, each of the acceleration profiles in FIGS. 4A, 4B and 4C is defined by a plurality of piecewise linear profile segments. The corresponding equations for determining velocity and position profiles are either first, second or third order polynomial equations. The coefficients for each of theses separate equations are calculated to satisfy the operator parameter inputs per FIGS. 5 and 6, as will be described. These coefficients determine not only the slopes and magnitudes of the profiles in FIGS. 4A–4C (as well as the corresponding velocity and position profiles), but also the durations of the various time stages in FIGS. 4A–4C. The profile data actually employed for control of the lehr loader actuators can be any or all of the position, velocity and acceleration profiles in position, velocity and acceleration control modes of operation, or any combination thereof.

Figure 6:
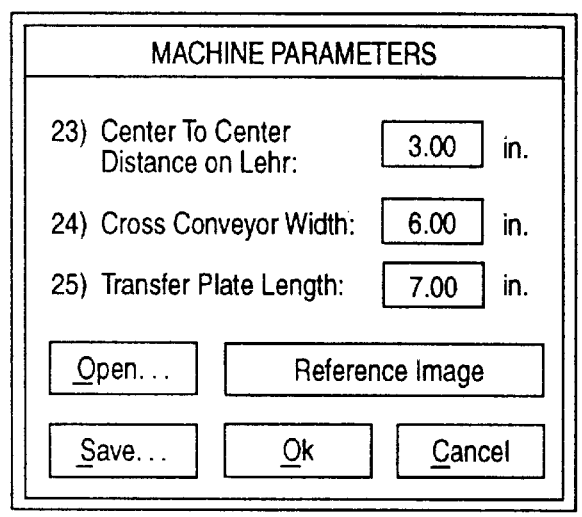
Figure 9:
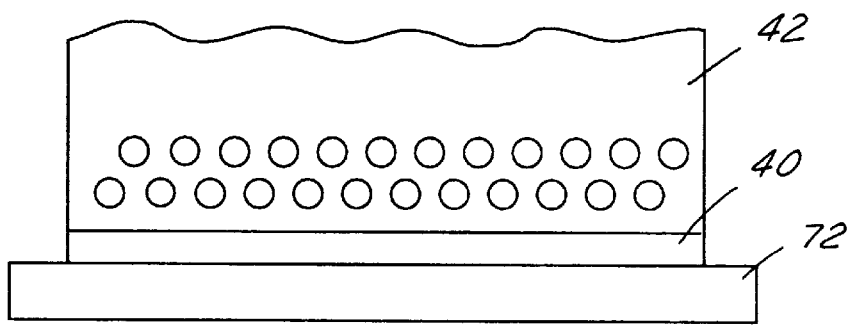
FIG. 9 is a schematic diagram that illustrates staggered lehr loading.

FIGS. 5 and 6 illustrate Windows-type tabular displays for operator setting of control parameters for generation of the motion profiles. In FIG. 5A, table 68a (or display screen 68 in FIG. 3) includes an alphanumeric identification of a number of profile parameters, together with corresponding changeable numeric values in associated boxes. For example, the forward motion profile parameters in FIG. 5A include: (1) pullback distance, which is the distance between loader bar 30 and containers on conveyor 22 at the start position of the loader bar illustrated in FIG. 2; (2) container diameter; (3) the dimension of the container leading edge to the conveyor leading edge; (4) push-on distance, which is the distance (positive or negative) from the bottle just being pushed onto the lehr mat (e.g., −0.38 in FIG. 5 means that 0.38 inches of the bottle remains on the transfer plate at the end of the forward stroke); (5) total stroke along the forward axis; (6) the desired contact velocity of the loader bar against the containers in the forward direction at maximum design cycle rate; (7) distance traveled at contact velocity—i.e., during stage three in FIG. 4A; and (8) forward deceleration distance—i.e., during stage five in FIG. 4A. Cycle timing parameters include: (9) maximum loader rate in cycles per minute; (10) desired loader rate in cycles per minute; (11) return time allocation, which is the percentage of total cycle time allocated to the return strokes; and (12) percentage of total cycle time allocated to contact with containers. A return time allocation of 48% is illustrated in FIG. 5. It is a significant feature of the present invention that a greater or lesser percentage of the total cycle time may be allocated to the return stroke as desired. The sideshift motion parameters in FIG. 5 include: (13) total sidestroke; (14) staggered sidestroke distance; (15) distance along the sidestroke axis to reach maximum velocity; (16) the percentage of the velocity of cross conveyor 22 to be matched by loader bar 30 in the sideshift direction; (17) forward distance onto transfer plate 40 before slowdown—i.e., the distance traveled during stage three in FIG. 4B; (18) total lehr width in number of containers—i.e., the center-to-center distance between the first and last containers contacted by the loader bar; and (19) center-to-center distance of the containers on cross conveyor 22. Staggered loading of containers is illustrated in FIG. 9. Parameter (14) selects the amount of stagger between rows. The lift motion profile parameters in FIG. 5A include: (20) the lift safety buffer, which is the separation between the containers and the loader bar as the bar passes over the containers; (21) total lift height; and (22) lift buffer raise offset. Other miscellaneous parameters loadable by the operator in FIG. 5 include loader bar part number and profile set name. Any or all of the specific numeric values in FIG. 5 may be modified by first moving a screen cursor (not shown) to the appropriate box employing cursor control mouse 70 (FIG. 3), entering a new numeric value using the keyboard of computer 66, and then "clicking" to load that value into memory.

Likewise, FIG. 6 illustrates a Windows-type tabular screen display 68b for operator setting of machine parameters, including: (23) center-to-center distance of containers on lehr conveyor 42 (FIG. 2); (24) total width of cross conveyor 22; and (25) total length of transfer plate 40. The specific numeric values in display 68b in FIG. 6 may be changed by an operator, although it is anticipated that, for a given machine, the parameters of FIG. 6 will remain constant following set up.

Figure 7A:
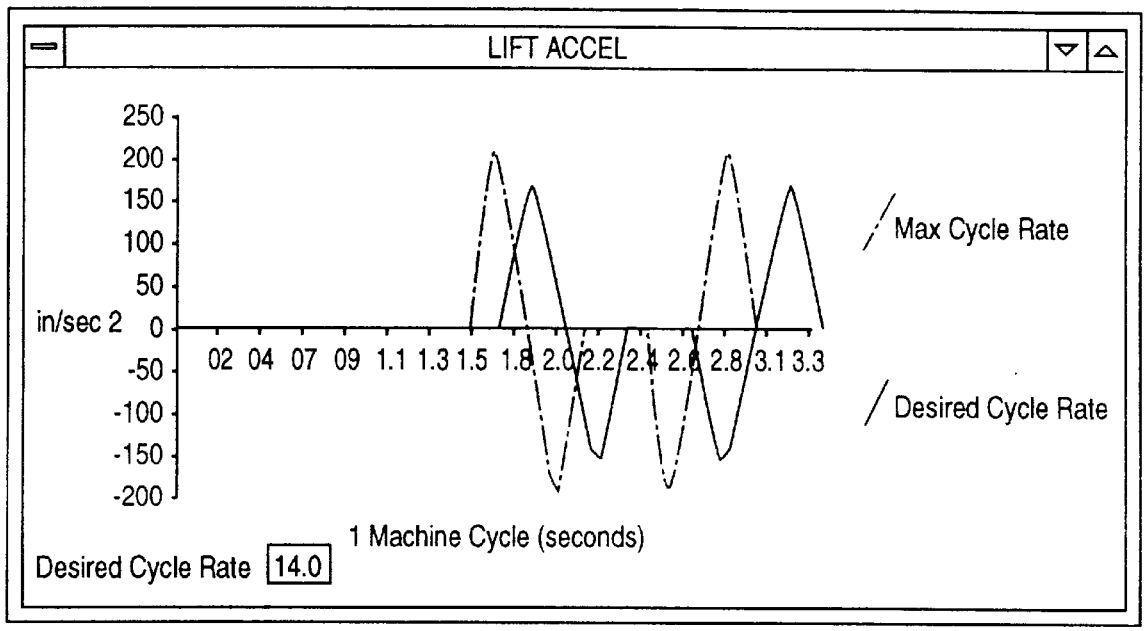
FIGS. 7A–7C are Windows-type graphic displays of acceleration, velocity and position profiles along the lift axis in accordance with the parameter data illustrated in FIGS. 5 and 6.
Figure 7B:
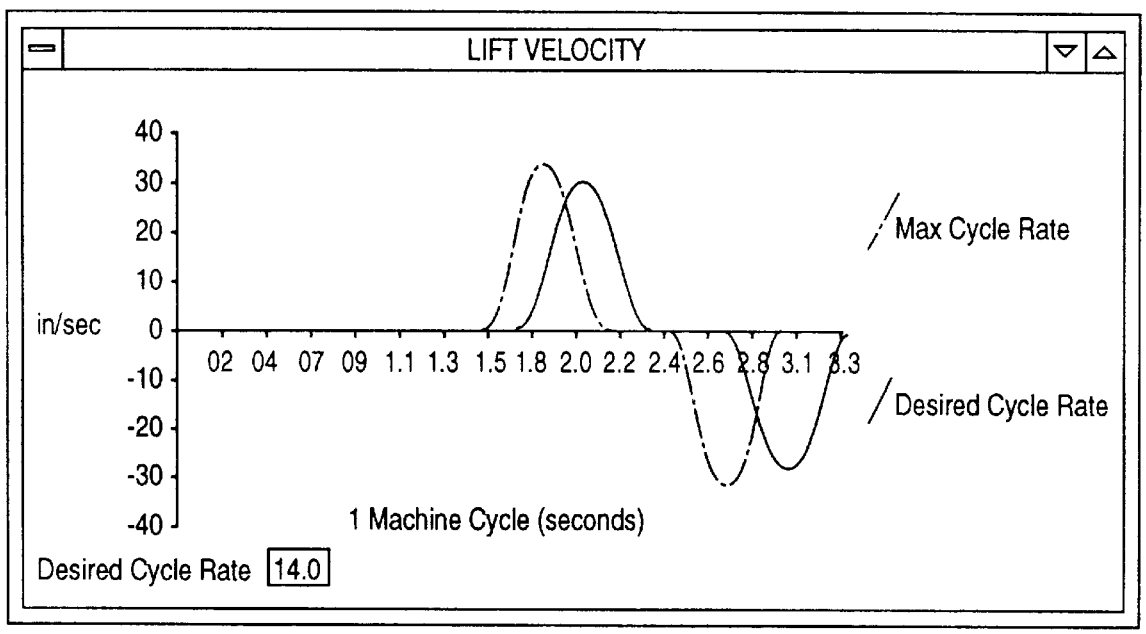
Figure 7C:
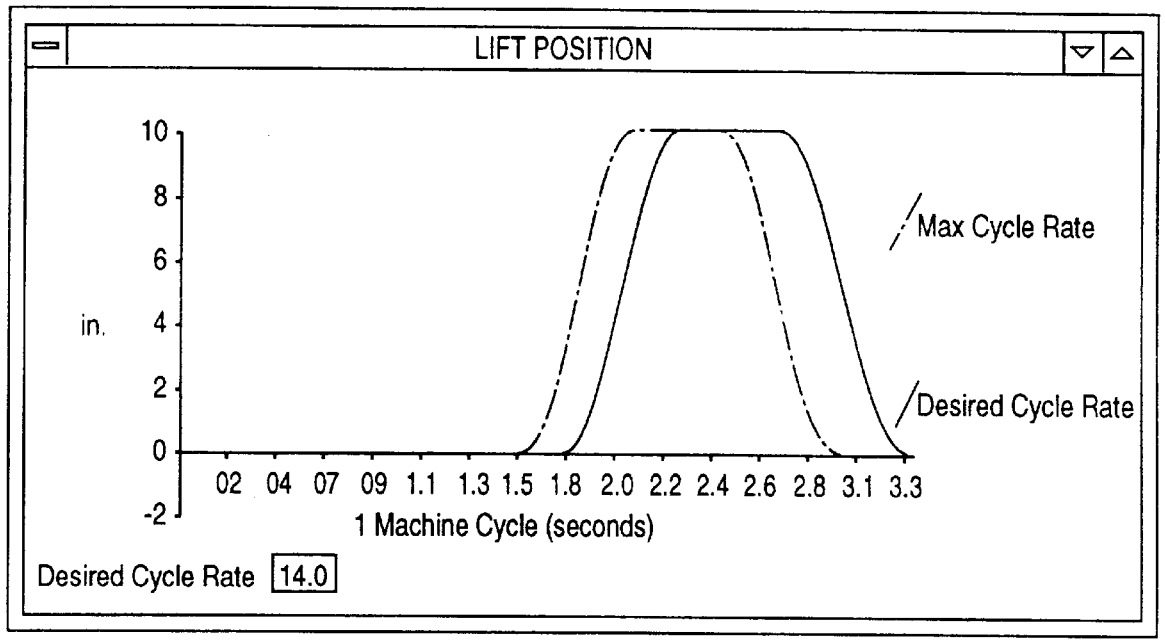

Following modification and/or entry of machine and/or profile parameters per FIGS. 5 and 6, the acceleration, velocity and position control profiles for each control axis are automatically calculated within computer 66. The resulting profiles may be selectively displayed on screen 68 (FIG. 3). FIGS. 7A–7C illustrate exemplary acceleration, velocity and position profiles along the lift axis for the exemplary parameters illustrated in FIGS. 5 and 6. In each of the Windows-type graphic displays of FIGS. 7A–7C, the corresponding profile at the desired cycle rate (parameter (10) in FIG. 5) is displayed along with the corresponding profile at the maximum cycle rate (parameter (9) in FIG. 5). The desired cycle rate is also displayed, permitting the operator to "click" on and change the desired cycle rate while observing the effect upon the displayed profile graph. The acceleration, velocity and position profiles for the forward and sideshift axes may also be selectively displayed in Windows-type format in the manner illustrated in FIGS. 7A–7C.

Figure 8A:
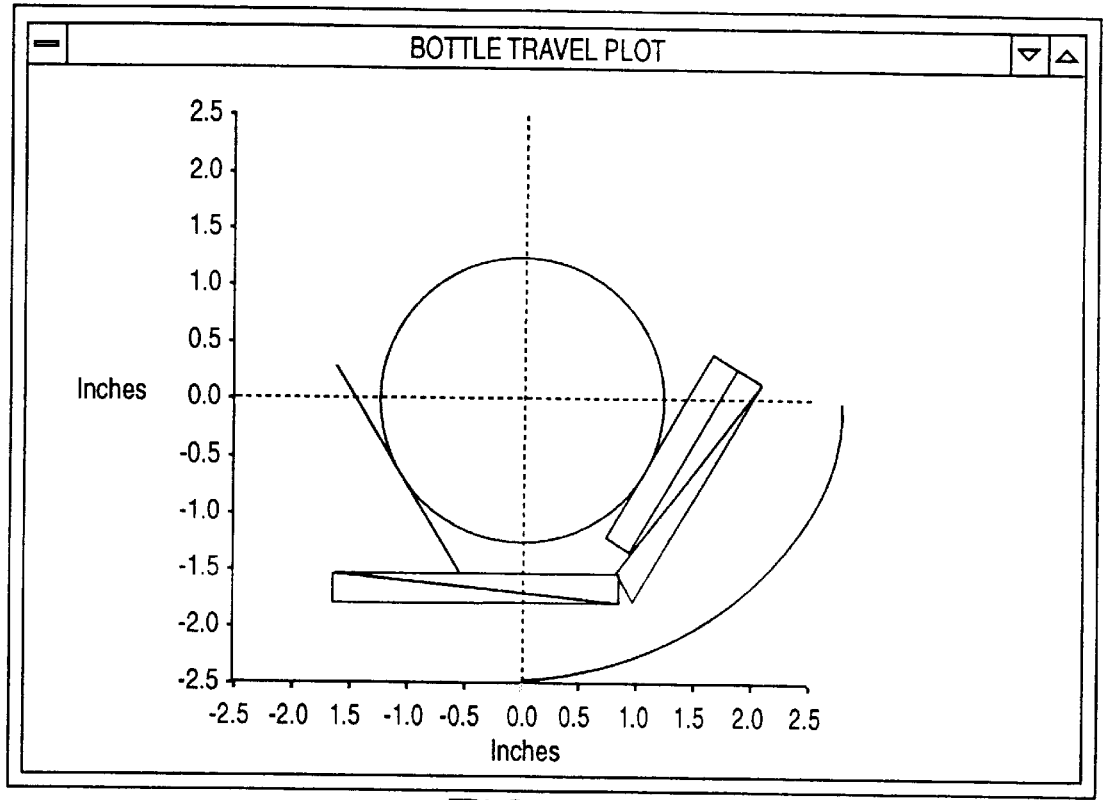
FIGS. 8A and 8B are Windows-type graphic displays for verification of lehr loader bar motion in accordance with the presently preferred embodiment of the invention.
Figure 8B:
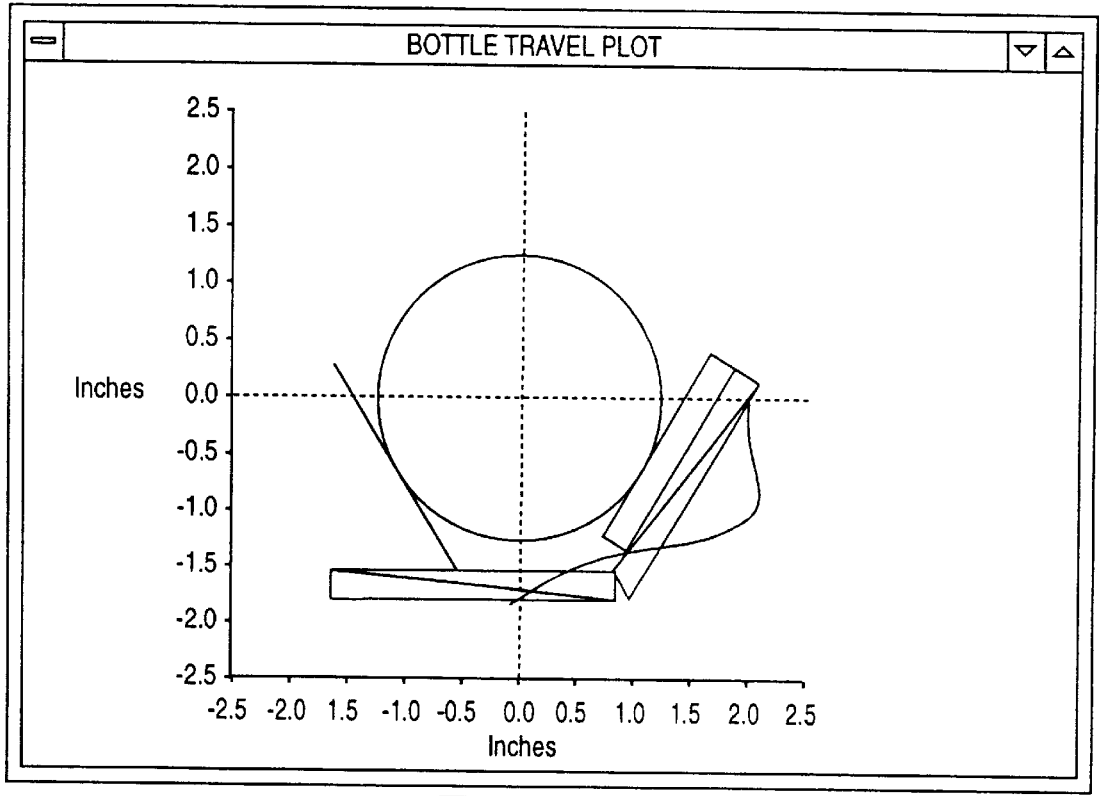

FIGS. 8A and 8B illustrate a feature of the present invention in which a static graph is generated for operator observation and verification of motion at the end of the loader bar versus the nearest point of the next container on the cross conveyor. The end of the loader bar is graphically illustrated, as is position of the next container with respect thereto. FIG. 8A illustrates that the loader bar will not interfere with the next container on the cross conveyor. Thus, the forward and/or sideshift profiles, from which the display of FIG. 8A was calculated, are satisfactory with respect to interference between the loader bar and the next container. On the other hand, FIG. 8B illustrates interference between the loader bar and the next container on the cross conveyor, indicating that the forward and/or sideshift profile must be modified by the user. (Such modification requires return to the parameter selection display of FIG. 5.)

After a profile set has been designed or optimized as desired, it may be stored in memory in console 64 and/or driver 38, together with a name or other suitable indicia for later identification and recall. There may thus be developed a library of profiles for later use and/or modification. This library would typically include basic profiles that cannot be changed, and other profiles that can be changed. Design of a new profile would normally start with call-up of existing profile parameters (FIG. 5) known by the operator to be basically similar to those desired, followed by modification to obtain desired operating characteristics. This new profile would then be stored in memory under a new name.

There has thus been provided a system and method for generating and/or modifying motion profiles for a lehr loader in an individual section glassware forming system that fully satisfy all of the objects and aims previously set forth. In particular, the system and method of the invention allow plant personnel to select, modify or generate motion profiles to obtain optimum performance at the lehr loader on an immediate basis for a given set of glassware handling conditions. The profile generation/modification program most preferably is in a Windows (trademark of Microsoft, Inc.) based program that is easy to learn and use. Passwords may be employed to screen operator access.

We claim:

1. Apparatus for controlling motions at a lehr loader having a loader bar and electric actuator means for controlling motions at said loader bar along forward, sideshift and lift axes independently of each other to load glassware from a cross conveyor across a transfer plate onto a lehr conveyor, said apparatus comprising:

means for operator entry of a plurality of control parameters that relate to physical characteristics of the glassware, cross conveyor, transfer plate, lehr and loader bar, electronic means for automatically translating said control pararmeters into motion profiles for each of said three axes, with each of said profiles comprising a data set of motion data versus time data, and means coupled to said electric actuator means for controlling motions at said loader bar along said three axes as functions of associated sets of said motion data versus time data.

2. The apparatus set forth in claim 1 wherein said means for operator entry comprises a display screen, means for displaying on said screen a table of control parameters and associated parameter numeric values, and means for selectively varying said numeric values under control of the operator.

3. The apparatus set forth in claim 2 wherein said electronic means includes means for automatically coordinating said motion profiles such that events in at least some of said profiles coincide with each other.

4. The apparatus set forth in claim 3 wherein said automatically coordinating means coordinates said forward and sideshift profiles such that velocity of said loader bar along said sideshift axis equals a desired percentage of cross conveyor velocity of contact of the loader bar with the containers along said forward axis.

5. The apparatus set forth in claim 4 wherein said desired percentage is among said control parameters.

6. The apparatus set forth in claim 3 wherein said automatically coordinating means coordinates said forward, sideshift and lift profiles such that return motions at all of said axes begin simultaneously.

7. The apparatus set forth in claim 2 wherein said control parameters for said forward axis are selected from the group consisting of: pullback distance of said loader bar from glassware on said cross conveyor, container diameter, distance from glassware on the cross conveyor to the transfer plate, push on distance, total forward stroke, contact velocity of the loader bar at maximum cycle rate, forward distance traveled at contact velocity and forward deceleration distance.

8. The apparatus set forth in claim 2 wherein said control parameters for said sideshift axis are selected from the group consisting of: total sideshift stroke, staggered sideshift stroke; sideshift distance to reach cross conveyor velocity, percent matching to cross conveyor velocity, sideshift distance from contact to slow-down, lehr width, and glass center-to-center distance on the cross conveyor.

9. The apparatus set forth in claim 2 wherein said control parameters for said lift motion are selected from the group consisting of: lift height, lift safety buffer, and lift buffer offset (?).

10. The apparatus set forth in claim 2 wherein said control parameters include cycle timing parameters selected from the groups consisting of: maximum loader cycle rate, desired loader cycle rate, and percent of total cycle time allocated to return strokes.

11. The apparatus set forth in claim 2 wherein said control parameters include miscellaneous parameters selected from the group consisting of: loader bar part number and profile set name.

12. The apparatus set forth in claim 2 wherein said control parameters include machine parameters selected from the group consisting of: glassware center-to-center distance on the lehr conveyor, cross conveyor width and transfer plate length.

13. The apparatus set forth in claim 2 further comprising means responsive to said profile data sets for selectively displaying said profile data graphically as a function of time.

14. The apparatus set forth in claim 2 further comprising means responsive to said profile data sets for graphically displaying separation between the loader bar and glassware on the cross conveyor.

15. A method of controlling motions of a loader bar in a lehr loader for transferring glassware from a cross conveyor across a transfer plate onto a lehr conveyor, said method comprising the steps of:

(a) coupling said loader bar to electric actuator means for controlling motions of the bar along forward, sideshift and lift axes independently of each other, (b) defining a plurality of control parameters that relate to physical characteristics of the glassware, cross conveyor transfer plate, lehr and loader bar, (c) automatically electronically translating said control parameters into motion profiles for each of said three axes, with each of said profiles comprising an electronic data set of motion data versus time data, (d) automatically electronically coordinating said motion profiles with each other such that events in at least some of said profiles coincide with events in other of said profiles, and (e) controlling motion at said loader bar through said electric actuator means along said three axes as a function of associated sets of motion data versus time data.

16. The method set forth in claim 15 wherein said step (b) comprises the steps of:

(b1) displaying on an operator screen a table of control parameters and associated parameter numeric values, and (b2) selectively varying said numeric values under control of an operator.

* * * * *